(No Model.) 2 Sheets—Sheet 1.

C. B. HODGES.
LUBRICATOR.

No. 418,131. Patented Dec. 24, 1889.

WITNESSES
Samuel E. Thomas
M. B. O'Dogherty

INVENTOR
Clarence B. Hodges
By W. W. Leggett
Attorney, (No Model.) 2 Sheets—Sheet 2.

C. B. HODGES.
LUBRICATOR.

No. 418,131. Patented Dec. 24, 1889.

WITNESSES
Samuel E. Thomas
M. B. O'Dogherty

INVENTOR
Clarence B. Hodges,
By W. W. Leggett
Attorney

UNITED STATES PATENT OFFICE.

CLARENCE B. HODGES, OF DETROIT, MICHIGAN.

LUBRICATOR.

SPECIFICATION forming part of Letters Patent No. 418,131, dated December 24, 1889.

Application filed July 26, 1888. Serial No. 281,085. (No model.)

*To all whom it may concern:*

Be it known that I, CLARENCE B. HODGES, a citizen of the United States, residing at Detroit, county of Wayne, State of Michigan, have invented a certain new and useful Improvement in Lubricators; and I declare the following to be a full, clear, and exact description of the invention, such as will enable others skilled in the art to which it appertains to make and use the same, reference being had to the accompanying drawings, which form a part of this specification.

Figure 1:
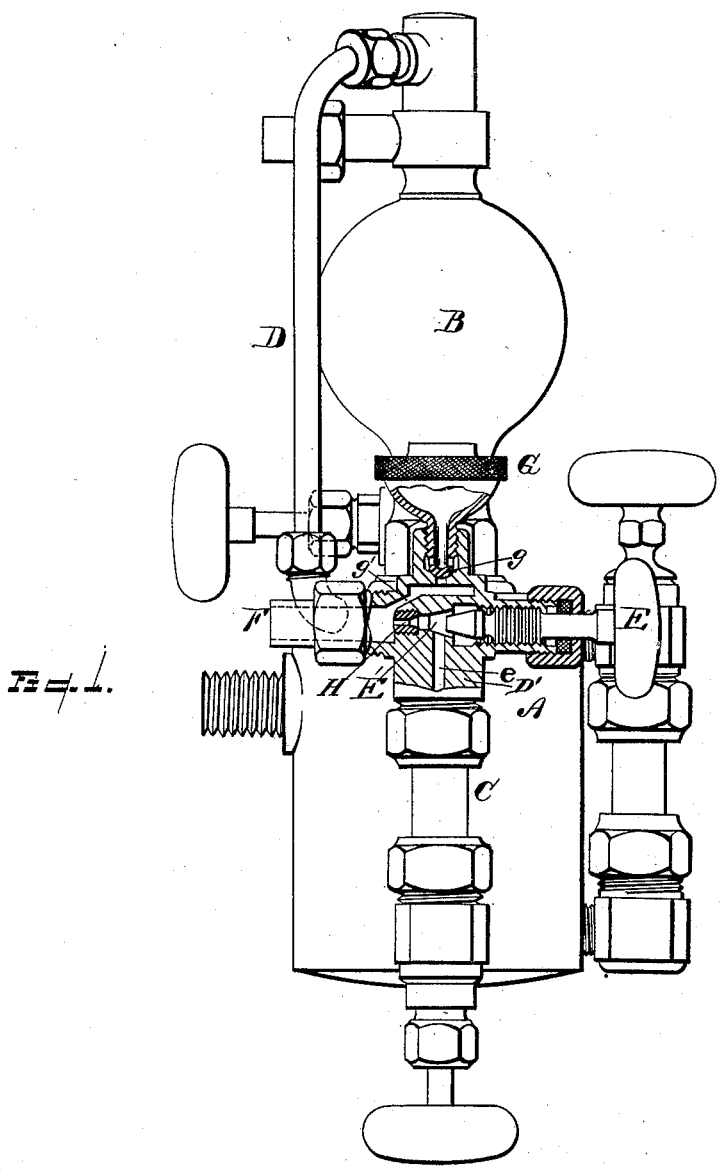
Figure 2:
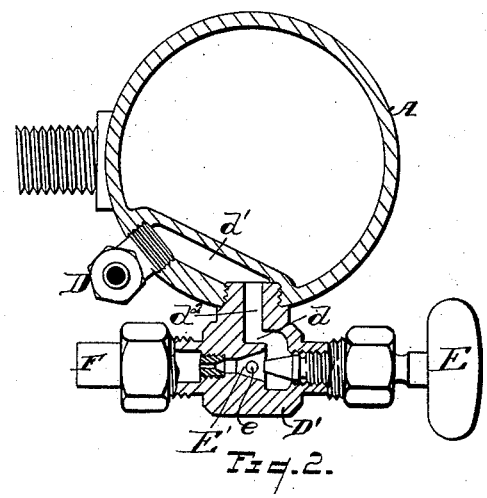

In the drawings, Figure 1 is a side elevation of a lubricator embodying my invention, showing parts broken away. Fig. 2 is a view in section by a horizontal plane passed through the oil-exit conduit.

My invention has for its object the production of a locomotive-lubricator in which such provision is made that should the sight-feed glass break the passage of steam may be by a single valve cut off from the equalizing-pipe and from the oil-exit conduit; also, in connection therewith, mechanism whereby an auxiliary oil-cup may be employed for feeding oil to the engine until the sight-feed glass may be replaced.

Heretofore in locomotive-lubricators provision has been made for closing off steam from the sight-feed glass in case of fracture of the glass; but this has required a more or less complicated arrangement of valves.

In carrying out my invention, A represents the oil-reservoir, B the condenser, and C the sight-feed glass of a locomotive-lubricator.

D is the equalizing steam-passage which taps the steam-space above the level at which water may accumulate in the condenser and leads into the oil-exit passage. This equalizing-pipe may tap the oil-exit passage at any convenient point, and it may lead thereto upon the outside of the lubricator, as shown, or upon the interior of the lubricator, in the way the same is commonly employed.

E is a valve located in the fitting D' at the top of the sight-feed glass. This valve has a seat E'. Back of this is a chamber $d$, which communicates with the equalizing-conduit D.

$e$ is the oil-passage, through which oil rises from the sight-feed glass on its way to the parts to be lubricated.

F is the oil-exit conduit. This part of the invention will now be understood. The valve E, when the lubricator is in use, remains wide open, and as long as the sight-feed glass remains intact the oil will flow freely up through the water in the sight-feed glass, thence through the orifice $e$, and out through the oil-exit conduit F. At the same time steam will exert and maintain its pressure through the equalizing-passage D upon the oil passing into the oil-conduit F. If, however, the sight-feed glass should burst or become broken, the engineer will immediately close the valve E. This valve, when seated, closes communication between the equalizing-conduit D and the oil-exit passage, and also closes the orifice $e$, which leads from the sight-feed glass, so that it serves simultaneously to prevent direct escape of steam from the equalizing-pipe and escape by back-pressure from the engine through the oil-exit conduit.

G is an auxiliary oiler. It is provided with a screw-stem and with a valve $g$ at its lower end, so that loosening or turning the oil-cup to raise the valve from its seat will open a free passage for the oil therefrom downward to the oil-exit conduit F. To reach this conduit it passes through the chamber or cored passage $g'$ in advance of the valve E, so that should the sight-feed glass be broken and the valve E be closed the engineer may fill oil into the auxiliary oiler. Then by momentarily closing the throttle-valve of his engine and raising the valve $g$ from its seat the oil in the auxiliary oiler would by suction be drawn through to the parts to be lubricated.

H is a restricted throat or nozzle in advance of the valve-seat E'. Its office is twofold: First, it operates to neutralize the effect of pulsations which would otherwise be given back from the steam-chest and cause a disturbance of the oil and water in the sight-feed glass. Its other purpose is to constitute a nozzle through which steam from the equalizing-pipe will pass with a sharp blast, and so, should the engineer at the time of starting his engine or at any other time desire to supply for the time being some oil through the auxiliary oiler, this blast of steam will serve as an injector to suck the oil in from the auxiliary oiler.

While the equalizing-conduit D may lead to the chamber $d$ back of the valve-seat E' by any route, I prefer to construct the same as shown in the drawings, so that it shall, after leaving the top of the condenser, pass downward and communicate with a cored passage $d'$ in the body of the lubricator, and thence through the passage $d^2$ in the fitting into the valve-chamber $d$. It is not essential that the equalizing-pipe should open into the chamber $d$ back of the valve-seat E', for it might be made to pass through the wall and open directly onto the valve-seat in the same way that the orifice $e$ opens onto the valve-seat, the essential feature being that the valve shall serve to close simultaneously the said three passages—viz., the equalizing-passage, the oil-exit passage and the passage $e$, leading from the sight-feed glass.

The location of the restricted nozzle or throat at the point indicated with respect to the oil-passage $g'$ is such that even when the lubricator has steam on its condenser and is feeding oil through its sight-feed glass the engineer may momentarily close the throttle-valve of the engine and feed oil through the auxiliary oiler, the issuing jet of steam having such a relation to the oil-passage $g'$ that the steam drives directly forward through the oil-exit passage, sucking the oil in from the auxiliary oiler, and without the danger, as heretofore, of the steam from the equalizer driving up out of the auxiliary oiler.

In lubricators as heretofore made when it has been found desirable to oil through the auxiliary oiler it has been necessary not only to close the throttle-valve of the engine but to shut off steam from the head of the lubricator. Of course it is only necessary in this construction that the oil-passage $g'$ shall enter the oil-exit passage F on the discharge side of the said throat or nozzle, so that the jet of steam may be delivered past and not be deflected up through the said passage.

I am not aware that an equalizer has heretofore been made to descend upon the exterior of the lubricator and then made to connect with a cored passage in the body of the lubricator, from which connection has been made with the sight-feed glass through the stem $d^2$, tapped into the said cored passage. This construction is very desirable, for by making the said cored passage $d'$ to extend more or less around the circumference of the oil-reservoir the equalizer may be located at any desired point; also, when once located it is a fixture and need not thereafter be disturbed. The construction admits of the stem $d^2$ being removed without in any way disturbing the equalizer. Again, by this construction, the steam in the equalizing-pipe, being conveyed upon the exterior of the condenser, does not serve to increase the temperature of the condenser and so impair its condensing properties, while the steam passing through the equalizer into the cored passage at the top of the oil-reservoir serves to maintain the oil in a hot and fluid condition and in proper condition to be fed from the lubricator. Of course the equalizer might be led directly to the stem $d^2$, and steam pass thence back into the cored passage $d$ and accomplish the same purpose of properly heating the oil. I would have such a construction regarded as embraced within my invention. The joints, moreover, are all upon the exterior, where any leakage or looseness occasioned by jar may be readily discovered and repaired.

I do not here lay claim to the broad feature of the equalizer communicating with the space between the exit-nozzle and the top of the sight-feed glass, for that feature is embraced in the joint application of myself and E. McCoy, Serial No. 281,112, filed July 26, 1888, nor to the broad feature of such a construction in connection with an auxiliary oiler and any valve for closing the nozzle between the auxiliary oiler and the sight-feed glass, for that is also shown and claimed in said application in connection with an automatic valve.

What I claim is—

1. In a locomotive-lubricator, the combination, with a sight-feed glass, an equalizing-conduit, and a valve located between said parts and adapted to simultaneously close them, of an oil-exit conduit and a contracted throat or nozzle H, connecting said oil-exit conduit and the valve-seat, substantially as described.

2. In a locomotive-lubricator, the combination, with the condenser, sight-feed glass, and oil-exit conduit, of an equalizing-tube extending from the steam-space above the condenser, thence upon the exterior of the condenser down to and communicating with a cored passage in the oil-reservoir, said passage having further communication with the back of the valve E, substantially as described.

3. In a locomotive-lubricator, the combination, with the condenser, oil-reservoir, the sight-feed glass, and oil-exit conduit, of an equalizing-conduit located upon the exterior of the condenser and having its lower end communicating with a cored passage in the top of the oil-reservoir, whereby steam is supplied to heat its contents, substantially as described.

In testimony whereof I sign this specification in the presence of two witnesses.

CLARENCE B. HODGES.

Witnesses:
M. B. O'DOGHERTY,
SAMUEL E. THOMAS.